US009622454B2

(12) United States Patent
Bishop

(10) Patent No.: US 9,622,454 B2
(45) Date of Patent: Apr. 18, 2017

(54) ELECTRIC FENCE BOX FUSE SYSTEM

(71) Applicant: John C. Bishop, Cookeville, TN (US)

(72) Inventor: John C. Bishop, Cookeville, TN (US)

( * ) Notice: Subject to any disclaimer, the term of this patent is extended or adjusted under 35 U.S.C. 154(b) by 227 days.

(21) Appl. No.: 14/335,595

(22) Filed: Jul. 18, 2014

(65) Prior Publication Data

US 2016/0020055 A1 Jan. 21, 2016

(51) Int. Cl.

*H01H 85/042* (2006.01)
*H01H 85/06* (2006.01)
*H01H 85/175* (2006.01)
*A01K 3/00* (2006.01)
*H01H 85/143* (2006.01)

(52) U.S. Cl.

CPC ......... *A01K 3/005* (2013.01); *H01H 85/1755* (2013.01)

(58) Field of Classification Search

CPC .. H01H 85/042; H01H 85/1755; H01H 85/06; H01H 85/143; H01H 2207/034; A01K 3/005
USPC ........................................................ 337/251
See application file for complete search history.

(56) References Cited

U.S. PATENT DOCUMENTS 1,950,199 A * 3/1934 Tritle .................... H01H 85/42 337/220
2,090,198 A * 8/1937 Heidger .................. H05C 1/02 256/10
2,198,358 A * 4/1940 Vaughan ................. H02H 1/00 256/10
2,916,587 A * 12/1959 Bernstein ............. H01H 85/201 337/232
3,287,524 A * 11/1966 Huber .................... H01H 85/38 337/159
3,551,869 A * 12/1970 Robinson ............. H01H 85/201 337/201
3,648,266 A 3/1972 Crist
3,778,741 A * 12/1973 Schmidt, Jr. ......... H01H 85/201 337/201
4,419,569 A * 12/1983 Colten ..................... H05B 3/56 219/517
4,725,825 A 2/1988 McKean
4,734,059 A * 3/1988 Melugin .............. H01H 85/201 337/201

(Continued)

FOREIGN PATENT DOCUMENTS

WO 2004095894 A1 11/2004
WO 2009028966 A1 3/2009

OTHER PUBLICATIONS

International Searching Authority Search Report and Written Opinion, dated Mar. 23, 2015 re: PCT/US2014/068845, 11 pages.

*Primary Examiner* — Anatoly Vortman
(74) *Attorney, Agent, or Firm* — Mark A. Pitchford; Waller Lansden Dortch & Davis, LLP

(57) ABSTRACT

A fuse system protects an electric fence box from lightning strikes that hit a fence connected to the electric fence box via the fuse system. The fuse system includes at least one fuse connecting an output terminal of the electric fence box to the electric fence and an optional second fuse connecting a ground terminal of the electric fence box to earth ground. Each fuse includes a filament at least 12 inches long inside a non-conductive tube (e.g., Mylar). A first lead connects a first end of the filament to the output terminal of the electric fence box, and a second lead connects a second end of the filament to the electric fence.

17 Claims, 6 Drawing Sheets

(56) References Cited

U.S. PATENT DOCUMENTS

| | | | | | |
|---|---|---|---|---|---|
| 5,018,991 | A * | 5/1991 | Katz | H01H 85/201 | 337/205 |
| 5,888,098 | A * | 3/1999 | Cheng | H01H 85/201 | 439/620.28 |
| 6,046,665 | A * | 4/2000 | Oh | H01H 85/10 | 337/181 |
| 6,265,981 | B1 | 7/2001 | Carson et al. | | |
| 2004/0085178 | A1 * | 5/2004 | Tanaka | C22C 12/00 | 337/159 |
| 2009/0174394 | A1 * | 7/2009 | Armstrong | G01R 1/36 | 324/115 |
| 2012/0309232 | A1 * | 12/2012 | Darr | H01H 85/202 | 439/620.28 |

* cited by examiner

ELECTRIC FENCE BOX FUSE SYSTEM

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to electric fence charger (i.e., electric fence box) protection systems. More particularly, this invention pertains to protecting electric fence boxes from lightning.

Electric fences are used by ranchers and farmers to keep animals in a designated area or out of a designated area. Electric fences include a first length of conductive material (i.e., the fencing) isolated from earth ground by insulators. The fence may also include a second length of conductive material connected to earth ground and spaced apart from the first length of conductive material. The first length of conductive material is connected to a first output of the electric fence box, and the second output of the electric fence box is connected to ground, and optionally to the second length of conductive material. The electric fence box is subject to damage from power line voltage spikes which can cause a surge in input current. Most electric fence boxes include fuses (e.g., round body 125V, 10 A fuses) to prevent over-current conditions from power line surges from damaging the fence box. The power surge burns out the filament in the fuse before the increased voltage and current can damage the electronics in the electric fence box. The largest standard fuses only have about 3 inches between contacts, but even a millimeter of separation between contacts is enough to prevent a 125V source from arcing between the contacts. The electric fence box is also subject to damage from lightning striking the fence. Lightning is a static charge that travels along the length of conductive material to the electric fence box. Lightning develops voltages much higher than 125V and can jump from one electrical contact to another across hundreds of feet. The 0.5" to 1" gap between the contacts in most standard fuses, and even the 3" gap between contacts available in some industrial fuses is not enough to prevent arcing between the contacts. Lightning typically arcs between the contacts in electronic fence box fuses and destroys the fence box when the lightning strikes the electric fence charged by the electric fence box.

BRIEF SUMMARY OF THE INVENTION

Aspects of the present invention provide a fuse system that protects an electric fence box from lightning strikes that hit a fence connected to the electric fence box. A fuse includes a filament at least 12 inches long inside a non-conductive tube. The fuse connects the electric fence box to the electric fence.

In one aspect, a fuse system for an electric fence system including an electric fence and an electric fence box includes a first fuse. The first fuse includes a tube, a filament, a first lead, and a second lead. The tube is generally electrically nonconductive. The filament is positioned within the tube. The filament has a first end and a second end opposite the first end. The filament is at least 12 inches long. The first lead is connected to the first end of the filament. The first lead is configured to connect to the electric fence box. The second lead is connected to the second end of the filament. The second lead is configured to connect to the electric fence.

In another aspect, an electric fence charging system operable to charge electric fence includes an electric fence box and a fuse system. The electric fence box has an output terminal and a ground terminal. The fuse system includes a first fuse. The first fuse includes a tube, a filament, a first lead, and a second lead. The tube is generally electrically nonconductive. The filament is positioned within the tube. The filament has a first end and a second end opposite the first end. The filament is at least 12 inches long. The first lead is connected to the first end of the filament. The first lead is configured to connect to the electric fence box. The second lead is connected to the second end of the filament. The second lead is configured to connect to the electric fence.

BRIEF DESCRIPTION OF THE SEVERAL VIEWS OF THE DRAWINGS

Reference will now be made in detail to optional embodiments of the invention, examples of which are illustrated in accompanying drawings. Whenever possible, the same reference numbers are used in the drawing and in the description referring to the same or like parts.

DETAILED DESCRIPTION OF THE INVENTION

Figure 1:
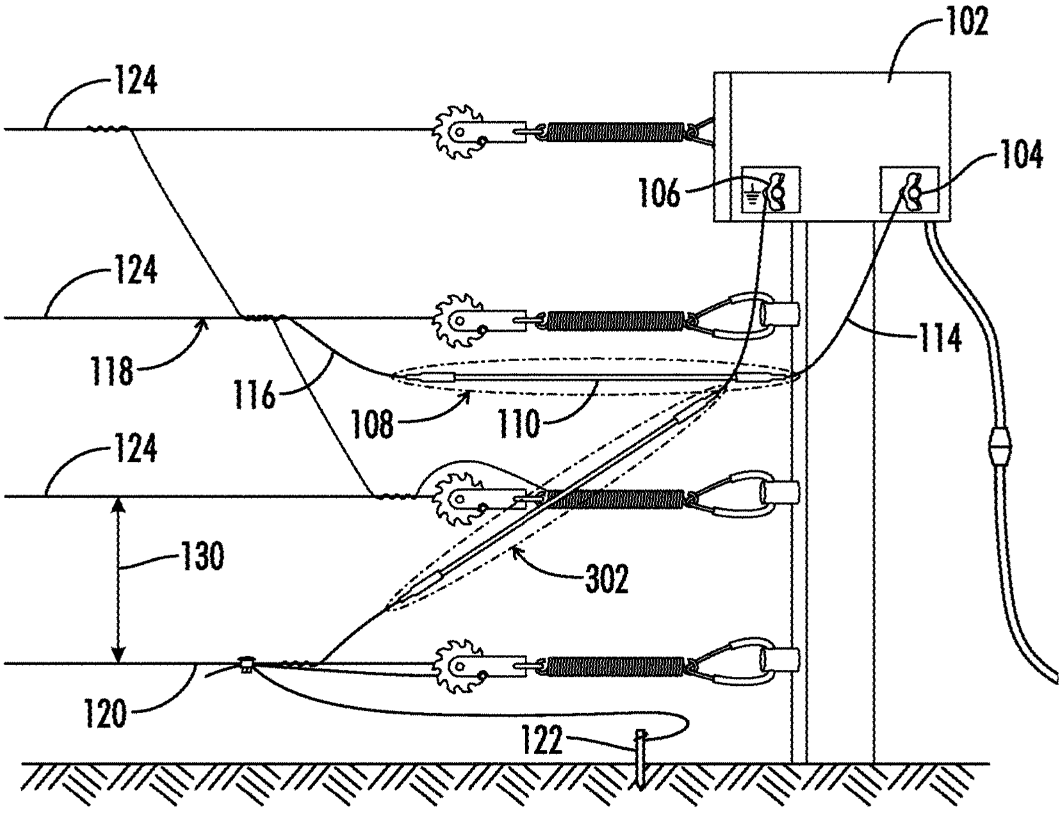
FIG. 1 is a side perspective view of an electric fence and electric fence charging system including a pair of fuses.
Figure 2:
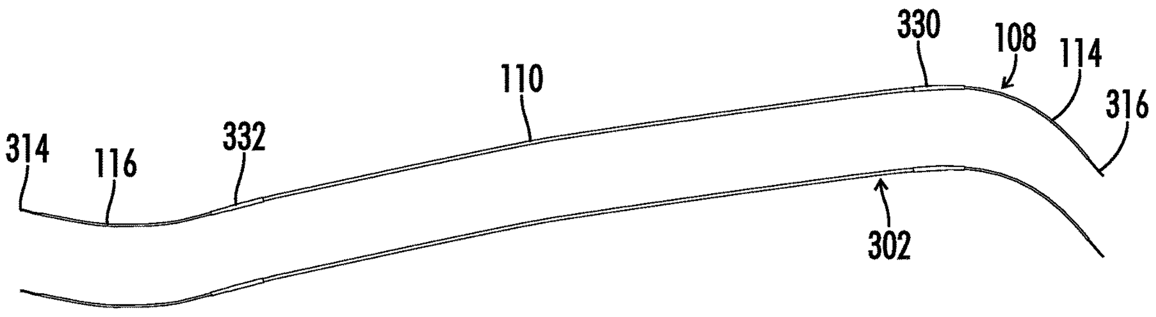
FIG. 2 is an isometric view of a pair of fuses.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as “a,” “an,” and “the” are not intended to refer to only a singular entity, but rather include the general class of which a specific example may be used for illustration. The terminology herein is used to describe specific embodiments of the invention, but their usage does not delimit the invention, except as set forth in the claims.

As described herein, an upright position is considered to be the position of apparatus components while in proper operation or in a natural resting position as described herein. Vertical, horizontal, above, below, side, top, bottom and other orientation terms are described with respect to this upright position during operation unless otherwise specified. The term "when" is used to specify orientation for relative positions of components, not as a temporal limitation of the claims or apparatus described and claimed herein unless otherwise specified. The terms "above", "below", "over", and "under" mean "having an elevation or vertical height greater or lesser than" and are not intended to imply that one object or component is directly over or under another object or component.

The phrase "in one embodiment," as used herein does not necessarily refer to the same embodiment, although it may. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The terms "coupled" and "connected" mean at least either a direct electrical connection between the connected items or an indirect connection through one or more passive or active intermediary devices.

Referring to FIGS. 1-6, an electric fence charging system is operable to charge an electric fence 118. The electric fence charging system includes an electric fence box 102 and a fuse system. The electric fence box 102 includes a charge terminal 104 and a ground terminal 106. The ground terminal 106 is operable to connect to earth ground, and the charge terminal 104 is operable to provide a static charge to the electric fence 118. The fuse system includes a first fuse 108 and optionally, a second fuse 302. In one embodiment, the first fuse 108 and the second fuse 302 have a similar construction. The electric fence 118 includes a ground line 120, and optionally, a charge line 124. The ground line 120 is connected to earth ground via an earth grounding spike 122. The charge line 124 is connected to the output terminal 104 of the electric fence box 102. The ground line 120 and the charge line 124 are separated by a first distance 130. Alternatively, the electric fence 118 may include a charge line 124 without a ground line 120. In this case, the second fuse 302 is configured to connect the grounding spike 122 to the ground terminal 106 of the electric fence box 102. In one embodiment, the first fuse 108 is configured to connect between the electric fence 118 and the output terminal 104 of the electric fence box 102.

Figure 3:
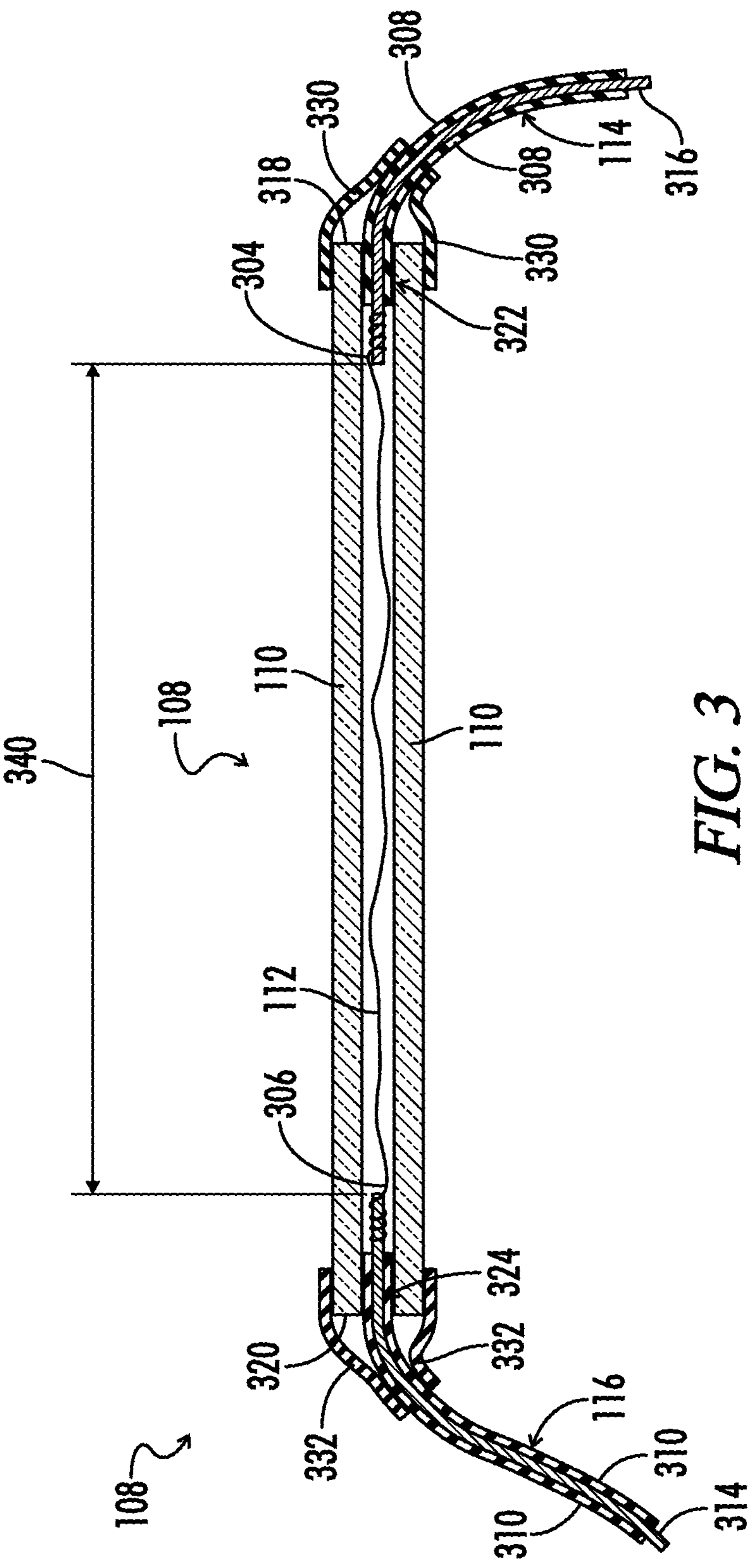
FIG. 3 is a longitudinal cross section of a fuse.
Figure 4:
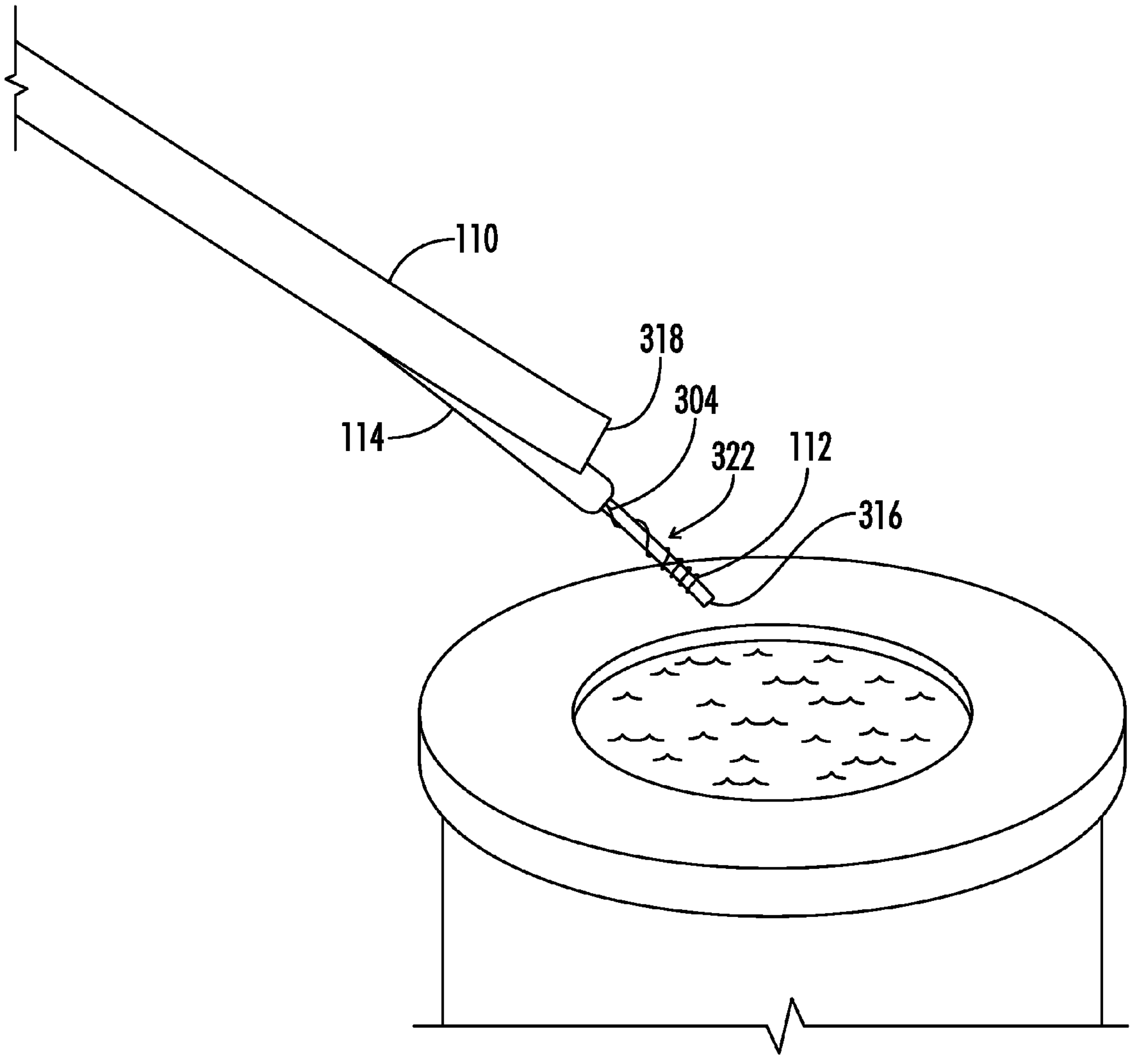
FIG. 4 is a perspective view of a partially assembled fuse with a filament connected to a first lead.
Figure 5:
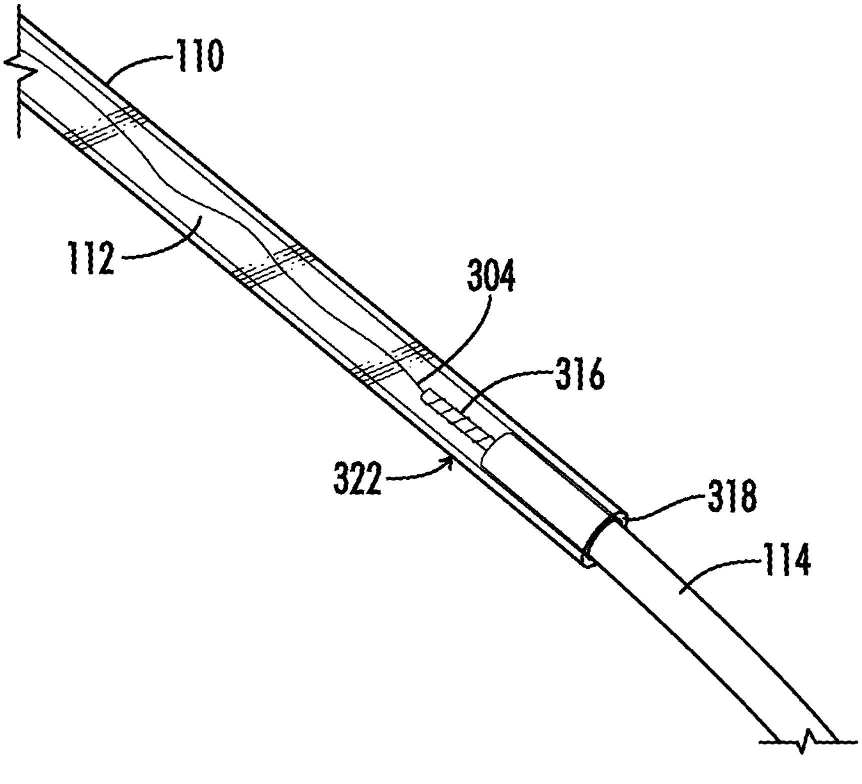
FIG. 5 is an isometric perspective view of a partially assembled fuse with a first lead inserted into a first end of a tube.
Figure 6:
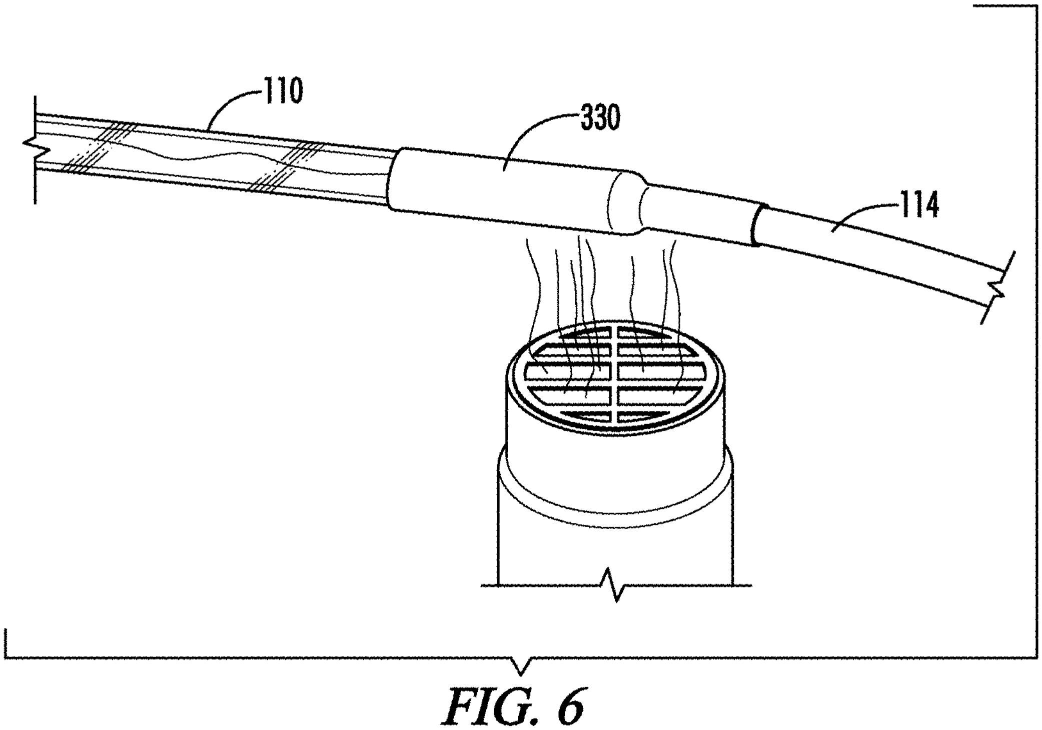
FIG. 6 is a side perspective view of a fuse with a sealant sealing a joint between a first lead and a tube of the fuse.

The first fuse 108 includes a tube 110, a filament 112, a first lead 114, and a second lead 116 (see FIG. 3). The tube 110 is generally electrically nonconductive. In one embodiment, the tube 110 is substantially formed from biaxially-oriented polyethylene terephthalate (e.g., Mylar), and the tube 110 is at least partially translucent (e.g., generally transparent). The tube 110 generally extends along a longitudinal axis. The tube 110 has a first end 318 and a second end 320 opposite the first end 318. In one embodiment, the tube 110 is at least 12 inches long, and in some embodiments the tube 110 is approximately 24 inches long.

The filament 112 is positioned within the tube 110 the filament 112 has a first end 304 and a second end 306 opposite the first end 304. The filament 112 is at least 12 inches long. In one embodiment, the filament 112 is approximately 24 inches long. In one embodiment, the filament 112 is bare copper wire with the gauge of approximately 33 American Wire Gauge (AWG) (e.g., a nominal diameter of approximately 0.0071 inches).

The first lead 114 is connected to the first end 304 of the filament 112. In one embodiment, the first end 304 of the filament 112 is connected to a wire 316 of the first lead 114 by wrapping the filament 112 around an exposed portion of the wire 316 at the end 322 of the first lead 114 and dipping the exposed end of the wire 316 of the first lead 114 into a solder bath (see FIG. 4). The first lead 114 is configured to connect to the electric fence box 102. In one embodiment, the first lead 114 is insulated wire, the wire 316 is at least 16 gauge, and the insulation 308 is rated for at least 1000 volts. An end 322 of the first lead 114 is inserted into the tube 110 at the first end 318 of the tube 110 such that the insulation 308 of the first lead 114 extends into the tube 110 (see FIGS. 3 and 5).

The second lead 116 is connected to the second end 306 of the filament 112. In one embodiment, the second end 306 of the filament 112 is connected to a wire 314 of the second lead 116 by wrapping the filament 112 around an exposed portion of the wire 314 at the end 324 of the second lead 116 and dipping the exposed end of the wire 314 of the second lead 116 into a solder bath (see FIG. 4). The second lead 116 is configured to connect to the electric fence 118 (e.g., a charge line 124 of the electric fence 118). In one embodiment, the second lead 116 is insulated wire, the wire 314 is at least 16 gauge, and the insulation 310 is rated for at least 1000 volts. An end 324 of the second lead 116 is inserted into the tube 110 at the second end 320 of the tube 110 such that insulation 310 of the second lead 116 extends into the tube 110 (see FIGS. 3 and 5).

As discussed above, the tube 110 extends along a longitudinal axis (see FIG. 3). In one embodiment, a second distance 340 along the longitudinal axis between the end 322 of the wire 316 of the first lead 114 and the end 306 and the end 324 of the wire 314 of the second lead 116 is at least 12 inches. In another embodiment, the second distance is approximately 24 inches. In yet another embodiment, the second distance is selected to be greater than the first distance 130 (i.e., the distance between the charge line 124 and the ground line 120 of the electric fence 118). The higher than air resistance of the tube 110 combined with the distance 340 between the ends of the first lead 114 and second lead 116 inside the tube 110 causes the resistance across the fuse 108, 302 to be greater than the air resistance between the ground line 120 and the charge line 124 such that lightning arcs between the fence lines and/or through free air instead of through the electric fence box 102.

In one embodiment, the first fuse 108 further includes a first sealant 330, and a second sealant 332. The first sealant 330 seals water (and generally air) out from a joint between the first lead 114 and the tube 110. The second sealant 332 seals water (and generally air) out from a joint between the second lead 116 and the tube 110. In one embodiment, the first sealant 330 and the second sealant 332 are sections of heat shrink tubing placed over the end of the tube 110 and a portion of the corresponding lead and set with a heat gun (see FIG. 6).

Although described herein in the context of a first fuse 108 connecting between the electric fence 118 and the electric fence box 102 and a second fuse 302 connecting between the electric fence box 102 and the grounding spike 122, it is contemplated that sufficient protection from lightning strikes for the electric fence box 102 may be achieved by use of either or both fuses at the same time. That is, the first fuse 108 may be used without the second fuse 302, or the second fuse 302 may be used without the first fuse 108 while still providing sufficient protection for the electric fence box 102. Further, because the first fuse 108 and the second fuse 302 have a substantially similar construction (e.g., they are generally intended to be identical), it is contemplated within the scope of the claims that the first fuse may be connected between the electric fence 118 and charge terminal 104 of the electric fence box 102 or between the grounding spike 122 and the ground terminal 106 of the electric fence box 102. Similarly, the second fuse 302 may be connected between the electric fence 118 and charge terminal 104 of the electric fence box 102 or between the grounding spike 122 and the ground terminal 106 of the electric fence box 102. That is, the first fuse 108 and the second fuse 302 are generally interchangeable.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention of a new and useful ELECTRIC FENCE BOX FUSE it is not intended that such references be construed as limitations upon the scope of this invention except as set forth in the following claims.

What is claimed is:

1. A fuse system for an electric fence system including an electric fence and an electric fence box, said fuse system comprising:

a first fuse comprising:

a tube, wherein the tube is generally electrically non-conductive;

a filament positioned within the tube, wherein the filament has a first end and a second end opposite the first end, and the filament is at least 12 inches long;

a first lead connected to the first end of the filament, wherein the first lead is connected to the electric fence box; and a second lead connected to the second end of the filament, wherein the second lead is connected to the electric fence; wherein the electric fence has a ground line connected to earth ground and a charge line connected to an output terminal of the electric fence box, wherein the ground line and the charge line are separated by a first distance;

the tube has a first end and a second end opposite the first end;

an end of the first lead is inserted into the tube at the first end of the tube such that insulation of the first lead extends into the tube;

an end of the second lead is inserted into the tube at the second end of the tube such that insulation of the second lead extends into the tube;

the tube extends generally along a longitudinal axis; and a second distance along the longitudinal axis between the end of the first lead inside the tube and the end of the second lead inside the tube is selected such that the second distance is greater than the first distance between the ground line and the charge line.

2. The fuse system of claim 1, wherein:

the tube of the first fuse is substantially formed from biaxially-oriented polyethylene terephthalate.

3. The fuse system of claim 1, wherein:

the filament of the first fuse is copper wire with a gauge of approximately 33 American Wire Gauge (AWG); and the filament of the first fuse is bare copper wire.

4. The fuse system of claim 1, wherein:

the first lead of the first fuse is insulated wire with insulation rated for at least 1000 volts; and the second lead of the first fuse is insulated wire with insulation rated for at least 1000 volts.

5. The fuse system of claim 1, wherein:

the first lead of the first fuse is insulated wire with insulation rated for at least 1000 volts;

a wire of the first lead is at least 16 gauge;

the second lead of the first fuse is insulated wire with insulation rated for at least 1000 volts; and a wire of the second lead is at least 16 gauge.

6. The fuse system of claim 1, wherein:

the first fuse further comprises:

a first sealant sealing water out from a joint between the first lead and the tube; and a second sealant sealing water out from a joint between the second lead and the tube.

7. The fuse system of claim 1, wherein:

the first fuse further comprises:

a first sealant sealing water out from a joint between the first lead and the tube; and a second sealant sealing water out from a joint between the second lead and the tube; and the distance along the longitudinal axis between the end of the first lead inside the tube and the end of the second lead inside the tube is at least 12 inches.

8. The fuse system of claim 1, wherein:

the distance along the longitudinal axis between the end of the first lead inside the tube and the end of the second lead inside the tube is approximately 24 inches.

9. The fuse system of claim 1, wherein:

the first fuse further comprises:

a first sealant sealing water out from a joint between the first lead and the tube; and a second sealant sealing water out from a joint between the second lead and the tube; and the distance along the longitudinal axis between the end of the first lead inside the tube and the end of the second lead inside the tube is approximately 24 inches.

10. The fuse system of claim 1, wherein:

the electric fence box has an output terminal and a ground terminal;

the first fuse is connected between the electric fence and the output terminal of the electric fence box; and the fuse system further comprises a second fuse connected between earth ground and the ground terminal of the electric fence box, wherein the second fuse comprises:

a tube, wherein the tube is generally electrically non-conductive;

a filament at least partially inside the tube, wherein the filament has a first end and a second end opposite the first end, and the filament is at least 12 inches long;

a first lead connected to the first end of the filament, wherein the first lead is connected to the ground terminal of the electric fence box; and a second lead connected to the second end of the filament, wherein the second lead is connected to an earth grounding spike.

11. An electric fence charging system for charging an electric fence, said electric fence charging system comprising:

an electric fence box having an output terminal and a ground terminal;

a fuse system comprising:

a first fuse comprising:

a tube, wherein the tube is generally electrically non-conductive;

a filament positioned within the tube, wherein the filament has a first end and a second end opposite the first end, and the filament is at least 12 inches long;

a first lead connected to the first end of the filament, wherein the first lead is connected to the electric fence box; and a second lead connected to the second end of the filament, wherein the second lead is connected to the electric fence; and wherein:

the electric fence comprises:

a ground line connected to earth ground via an earth grounding spike; and a charge line connected to the output terminal of the electric fence box, wherein the ground line and the charge line are separated by a first distance;

the tube of the first fuse has a first end and a second end opposite the first end;

an end of the first lead of the first fuse is inserted into the tube at the first end of the tube such that insulation of the first lead extends into the tube;

an end of the second lead of the first fuse is inserted into the tube at the second end of the tube such that insulation of the second lead extends into the tube;

the tube of the first fuse extends generally along a longitudinal axis; and a second distance along the longitudinal axis between the end of the first lead inside the tube and the end of the second lead inside the tube is selected such that the second distance is greater than the first distance between the ground line and the charge line of the electric fence.

12. The electric fence charging system of claim 11, wherein:

the tube of the first fuse is substantially formed from biaxially-oriented polyethylene terephthalate, and the tube is at least partially translucent.

13. The electric fence charging system of claim 11, wherein:

the filament of the first fuse is copper wire with a gauge of approximately 33 American Wire Gauge (AWG); and the filament of the first fuse is bare copper wire.

14. The electric fence charging system of claim 11, wherein:

the first lead of the first fuse is insulated wire with insulation rated for at least 1000 volts;

a wire of the first lead of the first fuse is at least 16 gauge;

the second lead of the first fuse is insulated wire with insulation rated for at least 1000 volts; and a wire of the second lead of the first fuse is at least 16 gauge.

15. The electric fence charging system of claim 11, wherein:

the first fuse further comprises:

a first sealant sealing water out from a joint between the first lead and the tube; and a second sealant sealing water out from a joint between the second lead and the tube; and the distance along the longitudinal axis between the end of the first lead inside the tube and the end of the second lead inside the tube is at least 12 inches.

16. The electric fence charging system of claim 11, wherein:

the distance along the longitudinal axis between the end of the first lead inside the tube of the first fuse and the end of the second lead inside the tube is approximately 24 inches.

17. The electric fence charging system of claim 11, wherein:

the electric fence box has an output terminal connected to the electric fence and a ground terminal connected to earth ground;

the first fuse is connected between the electric fence and the output terminal of the electric fence box; and the fuse system further comprises a second fuse connected between earth ground and the ground terminal of the electric fence box, wherein the second fuse comprises:

a tube, wherein the tube is generally electrically non-conductive;

a filament at least partially inside the tube, wherein the filament has a first end and a second end opposite the first end, and the filament is at least 12 inches long;

a first lead connected to the first end of the filament, wherein the first lead is connected to the ground terminal of the electric fence box; and a second lead connected to the second end of the filament, wherein the second lead is connected to an earth grounding spike.

* * * * *